(No Model.)　　　　　　　　　　　　　　　　　　3 Sheets—Sheet 1.
L. M. DEVORE.
BICYCLE STAND.

No. 506,675.　　　　　　　　　　Patented Oct. 17, 1893.

Witnesses:　　　　　　　　　　　　　Inventor:
Charles Shewey　　　　　　　　　　Levi M. Devore
A. J. H. Ebbesen　　　　　　　　　by Wilestprener & Bitun
　　　　　　　　　　　　　　　　　　Attorneys (No Model.) 3 Sheets—Sheet 2.

L. M. DEVORE.
BICYCLE STAND.

No. 506,675. Patented Oct. 17, 1893.

Witnesses:
Charles Harvey
A. J. H. Ebbesen

Inventor:
Levi M. Devore
by Niles, Greene & Bitner
Attorneys (No Model.) 3 Sheets—Sheet 3.
L. M. DEVORE.
BICYCLE STAND.
No. 506,675. Patented Oct. 17, 1893.
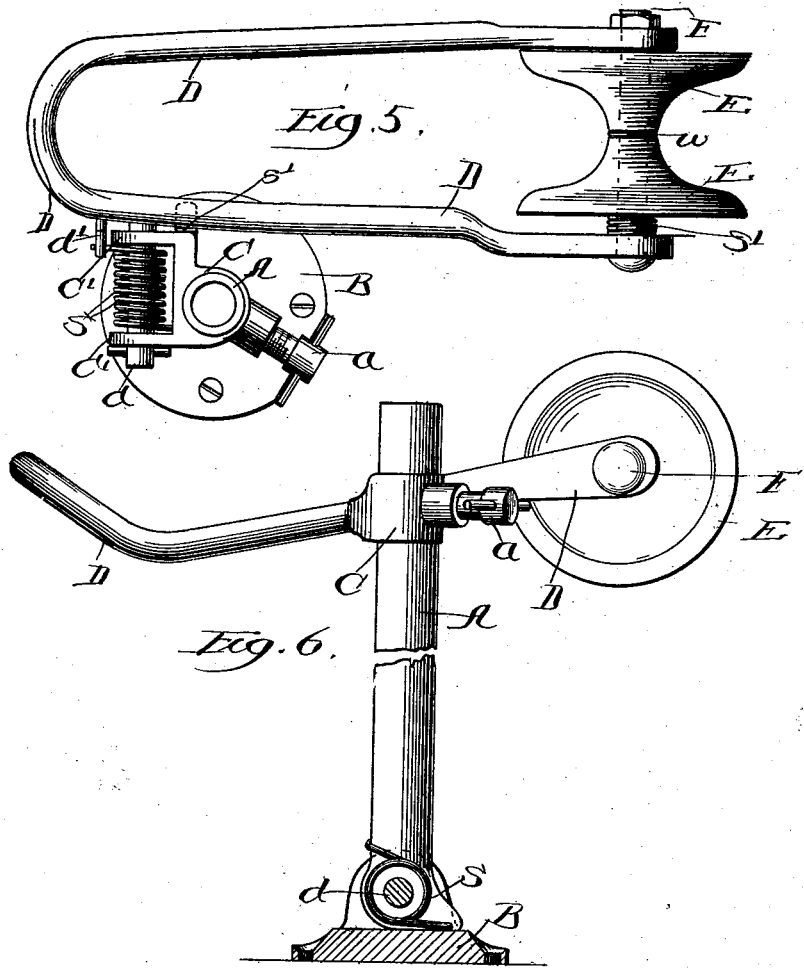
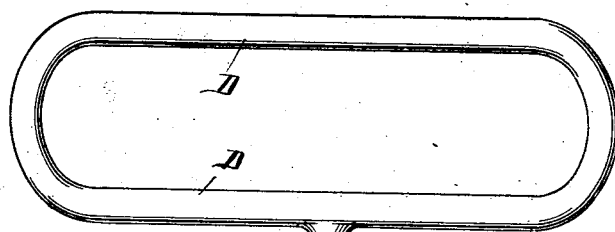
Witnesses:
Charles Shewey
A. J. H. Ebbesen
Inventor:
Levi M. Devore
by Wiles, Greene & Bolin
Attorneys.

UNITED STATES PATENT OFFICE.

LEVI M. DEVORE, OF FREEPORT, ILLINOIS.

BICYCLE-STAND.

SPECIFICATION forming part of Letters Patent No. 506,675, dated October 17, 1893.

Application filed March 16, 1893. Serial No. 466,267. (No model.)

*To all whom it may concern:*

Be it known that I, LEVI M. DEVORE, a citizen of the United States of America, residing at Freeport, in the county of Stephenson and State of Illinois, have invented certain new and useful Improvements in Bicycle-Stands, of which the following is a specification.

My invention relates to improvements in bicycle stands, its object being to provide a simple and practical stand adapted to be operated by the pressure of the bicycle wheel moving in its own vertical plane and to automatically clasp the upper portion of the rim of the wheel and prevent accidental movement of the bicycle in any direction so long as the wheel and stand are in working engagement.

The device consists substantially of a suitable rigid support to which is hinged a vertically oscillating yoke or loop of such length and width as to admit to the space within it a considerable arc of the upper portion of a bicycle wheel, the wheel being moved longitudinally into the loop, and the end of the loop first reached by the wheel being lifted to admit the wheel, the pressure of a spring or weight being utilized to draw the end downward as soon as the highest point of the wheel has passed under it and into the loop.

The invention is fully described and explained in this specification and shown in the accompanying drawings, in which—

Figure 1:
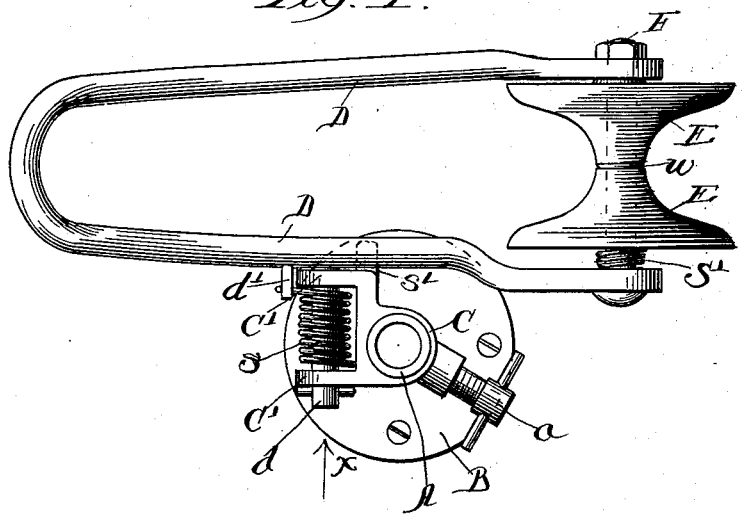
Figure 2:
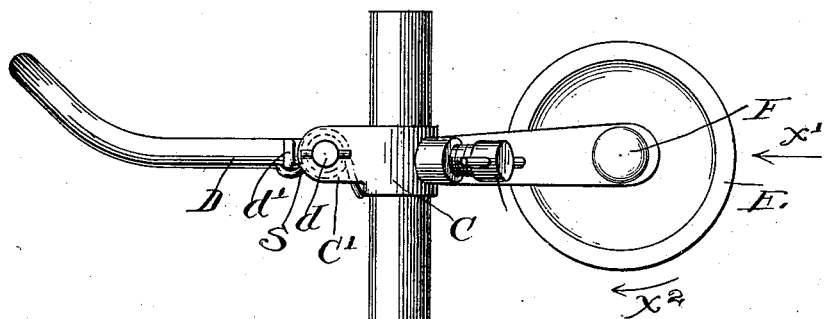
Figure 3:
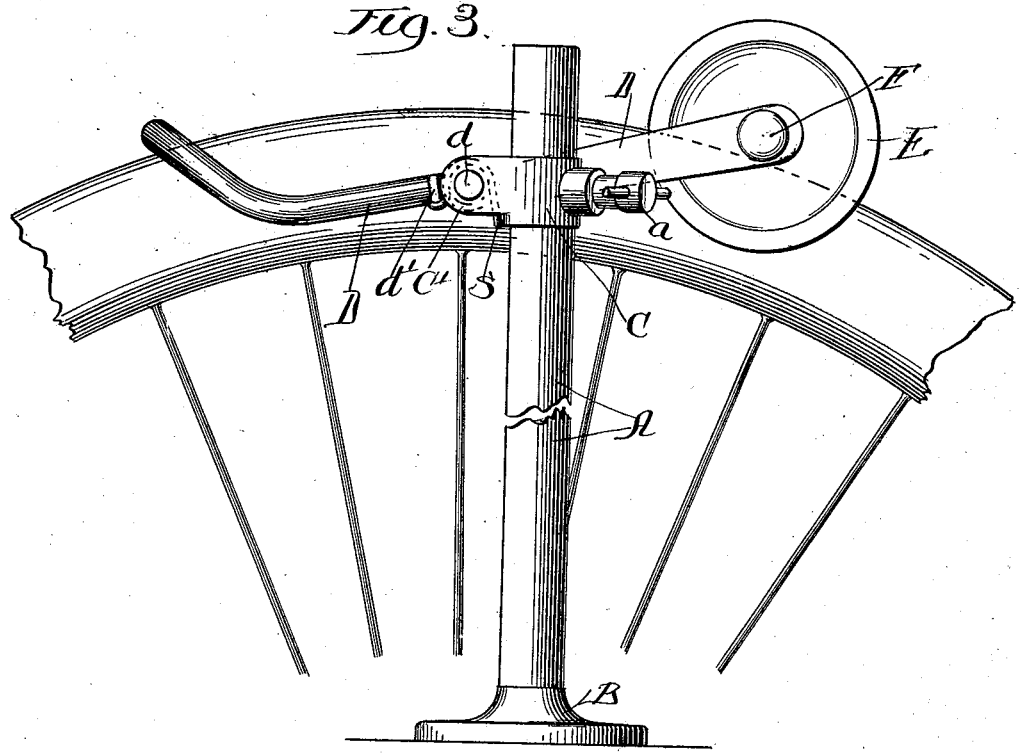
Figure 4:
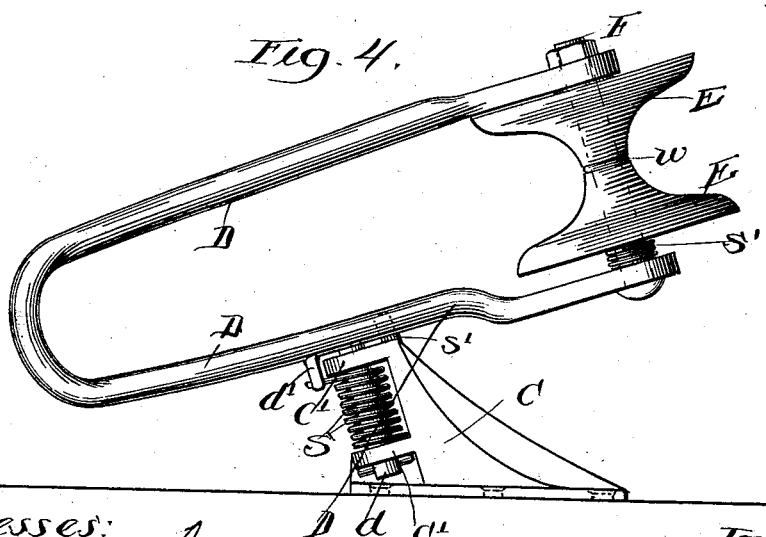

Figure 1 is a top plan of one form of stand embodying my invention. Fig. 2 is a side elevation of the same form in its normal position, the view being in the direction indicated by the arrow, $x$, in Fig. 1. Fig. 3 is a view similar to Fig. 2, but showing a bicycle wheel in working engagement with the moving part of the stand. Fig. 4 is a top plan showing a modification of my device, in which the wheel-engaging element is attached to a support fastened to a side wall. Fig. 5 is a plan of a modification of my device showing its working member hinged at one of its ends instead of at its center. Fig. 6 is a side elevation of another modification showing the hinge of the device in a different position. Fig. 7 is a top plan of another modification showing the hinge so arranged that the loop may swing in a plane transverse to its length instead of parallel thereto.

In Figs. 1 and 2, A is a standard provided with a base, B, adapted to be rigidly fastened to a floor. A collar, C, encircles the standard and is free to move up and down, or to swing upon it, a set screw, $a$, set in a hub upon the collar being adapted to fasten the collar in any desired position on the standard. Upon the collar, C, are formed two parallel vertical jaws, C', C', separated by a suitable space, and in these jaws is journaled a transverse gudgeon, $d$, formed integrally upon one of the members, D, D, of a metal loop of such length and width as to embrace a considerable arc of a bicycle wheel of ordinary construction. One end of the loop, which I shall call the rear end, is closed as shown, while the other end is left open, the free ends of the two members of the loop being preferably flattened in vertical planes. In these free ends is supported a transverse horizontal bolt or rod, F, on which are mounted two tapering rollers set with their small ends at the center, so as to form together a single grooved roller of such longitudinal section as to conform substantially to the tire of a bicycle. The two rollers, E, E, might be formed in a single piece, but I prefer to make them separate for convenience of construction, and also for the purpose of permitting their separation in order to increase the width of the groove between them in admitting bicycle tires of unusual large diameter. In order to provide for this separation of the two rollers, E, E, I have interposed between one of the rollers and the corresponding end of the member, D, of the loop a coiled spring, S', whose pressure tends to force the two rollers together. This spring may, however, be compressed by the outward movement of the roller with which it is in contact and will thus permit separation of the two rollers. In order to avoid wear of the parts I have found it convenient to interpose a washer, $w$, between the contiguous ends of the two rollers, E, E. About the gudgeon, $d$, which forms the pivot of the loop, is coiled a spring, S, one of whose ends engages a suitable point upon the collar, C, while its other end engages a lug, $d'$, formed on the loop, D, the spring being so arranged as to tend to raise the lower end of the loop and depress the front end; that is, the end in which the rollers, E, E, are mounted. The downward movement of the front end of the loop is, however, limited by means of a stop, $s'$, Fig. 1, formed upon the outer face of one of the jaws, $C'$, and lying immediately under the corresponding member of the loop. This stop is so arranged as to hold the loop normally in the substantially horizontal position shown in Fig. 2, the pressure of the spring being sufficient to press the loop downward upon the stop, $s'$, and to resist with considerable force the upward movement of the front end of the loop.

In use, the loop being in the position shown in Fig. 2, the wheel of a bicycle is rolled toward it in the direction indicated by the arrow, $x'$, in Fig. 2, the highest point of the wheel being somewhat higher than the lowest point of the rollers, E, E, at their smallest diameter. The margin of the wheel striking the rollers, lifts them up and, at the same time, rotates them in the direction indicated by the arrow, $x^2$, Fig. 2, thus preventing any friction between the parts. The wheel passes onward in the same direction until the rollers have passed over its highest point and until it strikes the closed rear end of the loop, the smallest diameter of the rollers being in contact with the wheel at one side of its highest point, and the rear end of the loop being in contact with it at the opposite side of its highest point, as shown in Fig. 3. The loop now embraces a considerable arc of the upper portion of the wheel and effectually prevents accidental movement of the wheel, either laterally or in its own plane. Whenever it is desired to remove the wheel, it may be readily withdrawn, the rollers, E, E, and the front end of the loop being lifted as the highest point of wheel passes under them and again dropped down to the normal position, after the wheel has passed out of the loop.

Fig. 4 illustrates a device the same as that shown in Fig. 2, except that the standard, A, is dispensed with, and the roller, C, is replaced by the bracket formed integral with the jaws, $C'$, $C'$, and adapted to be fastened to a side wall. In this construction, it is advisable to so form the bracket that the loop may stand in an oblique position with reference to the wall, the front end of the loop being farther from the wall than the rear end, so that the wheel may be rolled into the loop in a line oblique with reference to the wall.

Fig. 5 shows a modification in which the spring-actuated pivot of the loop is placed at the rear end thereof instead of being substantially opposite its center as shown in the previous figures. The operation of this device is substantially the same as that of the others, but I prefer to place the pivot near the center, since the weight of the parts and the force of the spring are better balanced in that construction than in the one illustrated in this figure.

Fig. 6 illustrates a device in which the standard, A, is rigidly fastened to the loop, but is itself pivoted to the foot, B, fastened to the floor, a spring being interposed between the standard and foot and so arranged as to depress the front end of the loop. In the operation of this form the pressure of the wheel as it enters the loop swings the front end of the loop upward, and, at the same time, swings the entire loop backward until the front end of the loop is raised above the highest point of the wheel when the wheel enters the loops and is secured.

Fig. 7 shows still another modification of my device, in which the loop is hung upon a hinge parallel to its length instead of transverse thereto, the loop being thus free to swing in a plane transverse to its length instead of in a plane parallel to its length. This form is practically operative, but I prefer the form shown in the preceding figures, in which the hinge pivot is transverse to the length of the loop. In this figure I have also shown a modified form of a loop, the rollers being dispensed with, and the loop itself being simply a longitudinally slotted plate, the slot being of substantially of the same dimensions as the interior of the loop shown in the other figures. I show this modification not because I consider it as desirable a form as the one shown in the preceding figures, but as indicating that I do not intend to limit my invention to any specific construction of the loop. In fact, so far as the form of the loop is concerned, it is only essential that its ends be so recessed as to clasp the wheel rim and its intermediate portion be of such shape that the wheel may be properly guided after it begins to enter the loop.

Having now described and explained my invention, what I claim as new, and desire to secure by Letters Patent, is—

1. In a bicycle stand, the combination with a suitable rigid support, of a loop hinged to said support and swinging vertically about its hinge, the loop being adapted to embrace an arc of the upper portion of a bicycle wheel substantially as shown and described.

2. In a bicycle stand, the combination with a suitable stationary support, of a loop hinged thereto and swinging vertically upon its hinge and a spring interposed between the loop and the support to which it is hinged and tending to depress one of the ends of the loop, said depressed end being adapted to be raised by the longitudinal movement of a bicycle wheel and to pass over the highest point of the wheel and the space within the loop being adapted to embrace an arc of the upper portion of the wheel; substantially as shown and described.

3. In a bicycle stand, the combination with a suitable stationary support, of a loop connected by a transverse pivot near its center with said support and a spring interposed between the loop and the support and tending to depress one of the ends of the loop, said depressed end being adapted to be raised by the movement of a bicycle wheel into the loop and the space within the loop being adapted to embrace an arc of the upper portion of the wheel; substantially as shown and described.

4. In a bicycle stand, the combination with a suitable stationary support, of a loop pivoted to the support and swinging vertically about its pivot, friction rollers mounted in one of the ends of said loop and a stop limiting the downward movement of the end in which said rollers are mounted, said rollers and the end of the loop in which they are mounted being adapted to be raised by the movement of a bicycle wheel in entering the loop and the entire loop being adapted to embrace an arc of the upper portion of the wheel; substantially as shown and described.

5. The combination with a suitable support, of the jaws, C', C', and means for securing them to said support, the loop, D, D, provided with a gudgeon, d, pivoted transversely in said jaws, the spring, S, coiled about the gudgeon, d, and swinging the loop about the line of said pivot, the rollers, E, E, mounted in one end of said loop and a suitable stop limiting the downward movement of the end of the loop in which said rollers are mounted, the force of the spring being exerted to depress said end and raise the opposite end of the loop; substantially as shown and described.

6. The combination with a stationary support and the loop D D pivoted thereto of the rollers, E, E, formed and arranged substantially as described, the bolt, F, passing through the members of the loop and supporting the rollers and the spring, S', tending to hold the rollers together and adapted to yield and permit their separation; substantially as shown and described.

LEVI M. DEVORE.

Witnesses:
H. H. ANTRIM,
C. A. NORTON.